(12) United States Patent  (10) Patent No.: US 8,154,780 B2
Cable et al.  (45) Date of Patent: Apr. 10, 2012

(54) HOLOGRAPHIC IMAGE PROJECTION SYSTEMS

(75) Inventors: Adrian James Cable, Harlton (GB); Paul Routley, Longstanton (GB); Nic Lawrence, Cambridge (GB)

(73) Assignee: Light Blue Optics, Ltd., Cambridge, Cambridgeshire (GB)

( * ) Notice: Subject to any disclaimer, the term of this patent is extended or adjusted under 35 U.S.C. 154(b) by 432 days.

(21) Appl. No.: 12/335,423

(22) Filed: Dec. 15, 2008

(65) Prior Publication Data

US 2010/0142016 A1   Jun. 10, 2010

(30) Foreign Application Priority Data

Dec. 8, 2008 (GB) ................................. 0822336.4

(51) Int. Cl.
*G03H 1/08* (2006.01)
*G03H 1/12* (2006.01)
(52) U.S. Cl. .............................. 359/9; 359/11
(58) Field of Classification Search ................. 359/9, 11
See application file for complete search history.

(56) References Cited

U.S. PATENT DOCUMENTS

| 5,767,842 | A | 6/1998 | Korth |
| 6,031,519 | A | 2/2000 | O'Brien |
| 6,281,878 | B1 | 8/2001 | Montellese |
| 6,377,238 | B1 | 4/2002 | McPheters |
| 6,611,921 | B2 | 8/2003 | Casebolt et al. |
| 6,614,422 | B1 | 9/2003 | Rafii et al. |
| 6,650,318 | B1 | 11/2003 | Arnon |
| 6,690,357 | B1 | 2/2004 | Dunton et al. |
| 6,710,770 | B2 | 3/2004 | Tomasi et al. |
| 7,084,857 | B2 | 8/2006 | Lieberman et al. |
| 7,242,388 | B2 * | 7/2007 | Lieberman et al. ........... 345/158 |
| 7,268,692 | B1 | 9/2007 | Lieberman |
| 7,305,368 | B2 | 12/2007 | Lieberman et al. |
| RE40,368 | E | 6/2008 | Arnon |
| 7,394,459 | B2 | 7/2008 | Bathiche et al. |
| 7,417,681 | B2 | 8/2008 | Lieberman et al. |
| 7,519,223 | B2 | 4/2009 | Dehlin et al. |
| D595,785 | S | 7/2009 | Wells et al. |

(Continued)

FOREIGN PATENT DOCUMENTS

GB   2 343 023   4/2000

(Continued)

OTHER PUBLICATIONS

Search Report for GB 0822336.4 dated Apr. 6, 2009.

(Continued)

*Primary Examiner* — Jade R Chwasz
(74) *Attorney, Agent, or Firm* — Knobbe, Martens, Olson & Bear, LLP

(57) ABSTRACT

A holographic image projection system for projecting an image at an acute angle onto a surface includes: a spatial light modulator (SLM) to display a hologram; an illumination system to illuminate the displayed hologram; projection optics to project light from the illuminated displayed hologram onto the surface at an acute angle form the image; and a processor having an input to receive input image data for display and an output to provide hologram data for the SLM, wherein the processor is configured to: input image data and convert this to target image data; generate from the target image data hologram data for display as a hologram on the SLM to reproduce a target image; and wherein the target image is distorted to compensate for the projection of the hologram at an acute angle to form the image.

36 Claims, 10 Drawing Sheets

U.S. PATENT DOCUMENTS

| 7,593,593 | B2 | 9/2009 | Wilson |
| 7,599,561 | B2 | 10/2009 | Wilson et al. |
| 2004/0095315 | A1 | 5/2004 | Montellese |
| 2007/0019103 | A1 | 1/2007 | Lieberman et al. |
| 2007/0182937 | A1 | 8/2007 | Cheng et al. |

FOREIGN PATENT DOCUMENTS

| GB | 2436676 A | 3/2007 |
| GB | 2438681 A | 5/2007 |
| GB | 2439856 A | 9/2008 |
| IL | 136432 | 12/2001 |
| JP | 10039141 A | 12/1999 |
| JP | 11352591 A | 12/1999 |
| WO | WO 00/21024 | 4/2000 |
| WO | WO 01/93006 | 12/2001 |
| WO | WO 01/93182 | 12/2001 |

OTHER PUBLICATIONS

U.S. Appl. No. 60/246,558, filed Nov. 7, 2000, Lieberman et al.
U.S. Appl. No. 60/163,445, filed Nov. 4, 1999, Rafii et al.
U.S. Appl. No. 60/231,184, filed Sep. 7, 2000, Rafii et al.
U.S. Appl. No. 60/272,120, filed Feb. 27, 2001, Tomasi.
U.S. Appl. No. 60/287,115, filed Apr. 27, 2001, Rafii et al.
Buckley, "Holographic Laser Projection Technology," SID International Symposium, Digest of Technical Papers, Society for Information Display, vol. 39, No. 2, pp. 1074-1079, May 23, 2008.
Buckley, et al. "Full Colour Holographic Laser Projector HUD," SID Vehicles and Photons 2008—15th Annual Symposium on Vehicle Displays, pp. 1-5, Oct. 17, 2008.
Buckley, "holographic Laser Projection Technology," Information Display, pp. 22-25, Dec. 2008.
Rosen, "Computer-generated Holograms of Images Reconstructed on Curved Surfaces," Applied Optics, vol. 38, No. 29, pp. 6136-6140, Oct. 10, 1999.
International Search Report and Written Opinion for international application No. PCT/GB2009/051647, dated Feb. 15, 2010.
International Search Report for international application No. PCT/GB2009/051638, dated Mar. 23, 2010.
Search and Examination Report dated May 13, 2009 for UK application No. GB0823457.7.

* cited by examiner

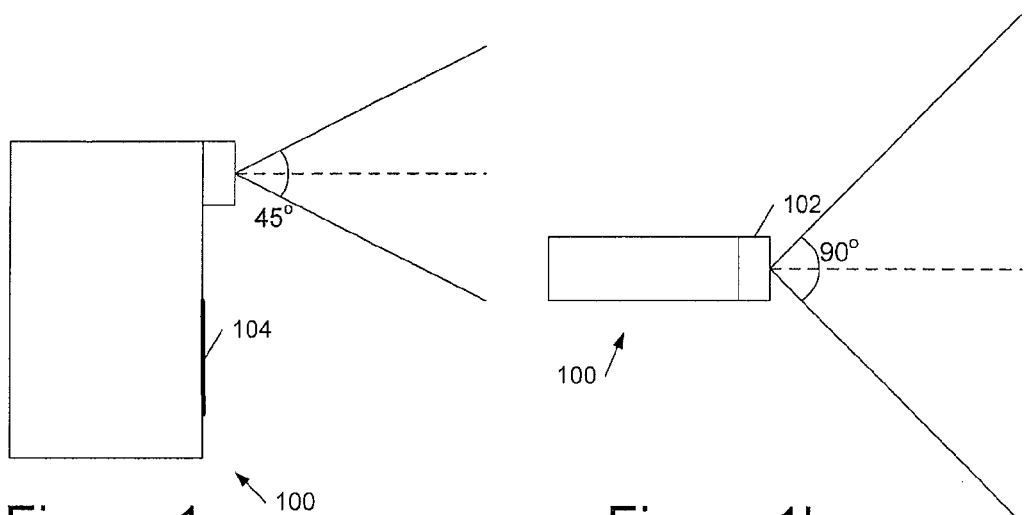
Figure 1a    Figure 1b
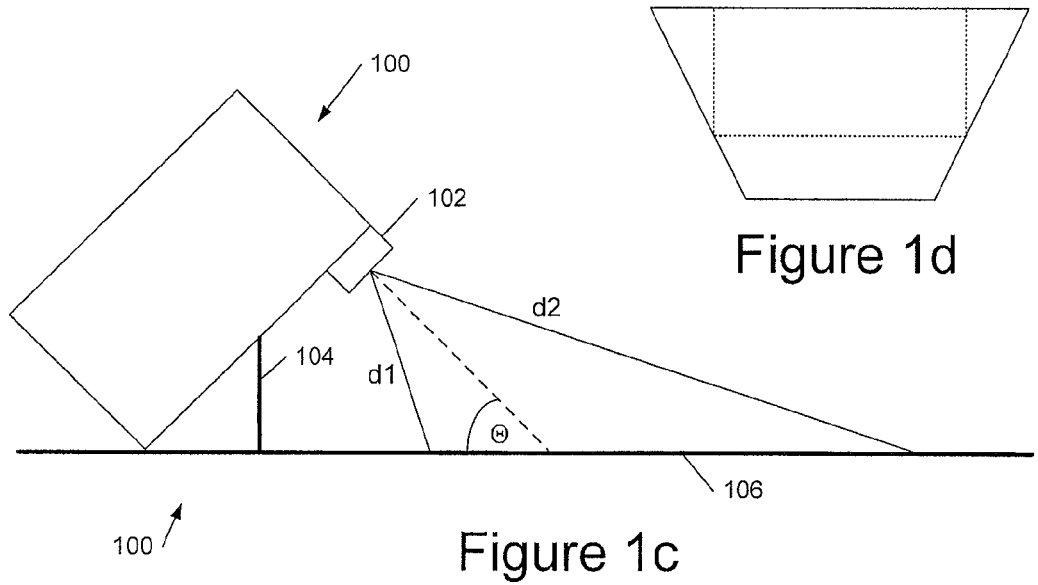
Figure 1d
Figure 1c
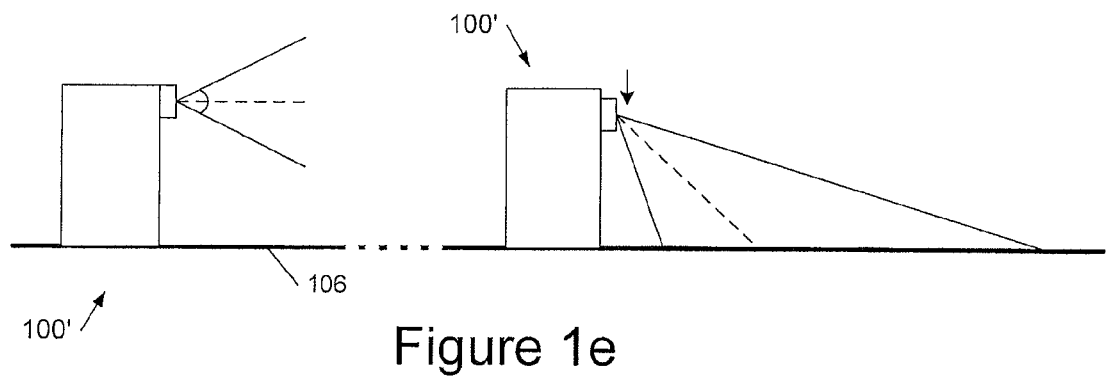
Figure 1e

HOLOGRAPHIC IMAGE PROJECTION SYSTEMS

CLAIM OF PRIORITY

This application claims priority under 35 U.S.C. §119 to United Kingdom Application No. 0822336.4, filed Dec. 8, 2008, which is incorporated in its entirety by reference herein.

BACKGROUND OF THE INVENTION

1. Field of the Invention

This invention relates to holographic image projection systems, more particularly to systems which are able to project down on to a table at an acute angle, preferably as well as projecting forwards. The invention also provides related methods and corresponding processor control code.

2. Description of the Related Art

We have previously described techniques for displaying an image holographically—see, for example, WO 2005/059660 (Noise Suppression Using One Step Phase Retrieval), WO 2006/134398 (Hardware for OSPR), WO 2007/031797 (Adaptive Noise Cancellation Techniques), WO 2007/110668 (Lens Encoding), and WO 2007/141567 (Colour Image Display). These are all hereby incorporated by reference in their entirety.

Projecting downwards and outwards onto a flat surface such as a tabletop entails projecting at an acute angle onto the display surface (taking this as the angle between the centre of the output of the projection optics and the middle of the displayed image—this angle, to a line in the surface, is less that 90°). We conveniently refer to this as "table down projection". Table down projection is not readily achievable by conventional image display techniques; scanning image display systems have a narrow throw angle and thus find it difficult to achieve a useful image size whilst projection systems, especially those based on LEDs (light emitting diodes) which have a wide light output angle, find it difficult to achieve a useful depth of field. Moreover table down projection can often involve very substantial distortion of an image which can result in inefficient use of the area of an image display device, resulting in major reductions in image brightness and overall system efficiency. Background information relating to compensating for keystone distortion in an LCD projector can be found in U.S. Pat. No. 6,367,933 (WO00/21282); further background prior art can be found in: WO02/101443; U.S. Pat. No. 6,491,400; and U.S. Pat. No. 7,379,619.

SUMMARY OF THE INVENTION

According to a first aspect of the invention there is therefore provided a holographic image projection system for projecting an image at an acute angle onto a surface, the system comprising: a spatial light modulator (SLM) to display a hologram; an illumination system to illuminate said displayed hologram; projection optics to project light from said illuminated displayed hologram onto said surface at an acute angle form said image; and a processor having an input to receive input image data for display and an output to provide hologram data for said spatial light modulator, and wherein said processor is configured to: input image data; convert said input image data to target image data; generate from said target image data hologram data for display as a hologram on said spatial light modulator to reproduce a target image corresponding to said target image data; and output said hologram data for said spatial light modulator; and wherein said target image is distorted to compensate for said projection of said hologram at an acute angle to form said image.

In embodiments of the system, because diffraction is employed light from the entire illuminated area of the hologram can be directed into the distorted target image field. Moreover, the displayed image is substantially focus-free; that is the focus of the displayed image does not substantially depend upon the distance from the holographic image projection system to the display surface. A demagnifying optical system may be employed to increase the divergence of the modulated light to form the displayed image, thus allowing an image of a useful size to be displayed at a practical distance.

The field of the displayed image suffers from keystone distortion, the trapezoidal distortion of a nominally rectangular input image field caused by projection onto a surface at an angle which is not perpendicular to the axis of the output optics. Thus the holographic image projection system internally generates a target image to which the inverse distortion has been applied so that when this target image is projected holographically the keystone distortion is compensated. The target image is the image to which a holographic transform is applied to generate hologram data for display on the SLM. Thus in some preferred embodiments the system also includes non-volatile memory storing mapping data for mapping between the input image and the target image.

To convert from the input image to the target image either forward or reverse mapping may be employed, but preferably the latter, in which pixels of the target image are mapped to pixels of the input image, a value for a pixel of the target image then being a assigned based upon lookup of the value of the corresponding pixel in the input image. Thus in some preferred embodiments the trapezoidal shape of the target image field is located in a larger, for example rectangular target image (memory) space and then each pixel of the target image field is mapped back to a pixel of the (undistorted) input image and this mapping is then used to provide values for the pixels of the target image field. This is preferable to a forward mapping from the input image field to the distorted target image field for reasons which are explained below. In either case, however, in some preferred embodiments the holographic transform is only applied to the distorted, generally trapezoidal target image field rather than to the entire (rectangular) target image memory space, to avoid performing unnecessary calculations.

Where reverse mapping as described above, is employed preferably compensation is also applied for variations in per unit area brightness of the projected image due to the acute angle projection. Thus while diffraction from a given pixel of the SLM will contribute to substantially the entire displayed hologram, nonetheless the diffracted light from this pixel will be distorted resulting in more illumination per unit area at the short-side end of the trapezoid as compared with the long-side end of the trapezoid. Thus in preferred embodiments an amplitude or intensity scale factor is applied the value of which depends upon the location (in two dimensions) of a pixel in the target image space. This amplitude/intensity compensation may be derived from a stored amplitude/intensity map determined, for example, by a calibration procedure or it may comprise one or a product of partial derivatives of a mapping function from the input image to the anti-distorted target image. Thus, broadly speaking, the amplitude/intensity correction may be dependent on a value indicating what change of area in the original, input image results from a change of area in the anti-distorted target image space (at the corresponding position) by the same amount.

As mentioned above, rather than a reverse mapping a forward mapping from the input image space to the distorted target image space may alternatively be employed. This is in general less preferable because such a mapping can leave holes in the (anti-) distorted target image where, in effect, the target image is stretched. Thus mapping pixels of the input image to pixels of the target image may not populate all the pixels of the target image with values. One approach to address this issue is to map a pixel of the input image to an extended region of the target image, for example, a regular or irregular extended spot. In this case a single pixel of the input image may map to a plurality of pixels of the target image. Alternatively once pixel values of the target image have been populated using pixels of the input image, pixels of the target image which remain unpopulated may be given values by interpolation between pixels of the target image populated with pixel values. Where a single input image pixel is mapped to an extended region of the target image, these extended regions or spots may overlap in the target image, in which case the value of a target image pixel may be determined by combining more particularly summing, the overlapping values (so that multiple input image pixels may contribute to the value of a single target image pixel). With this approach compensation for per unit area brightness variation is achieved automatically by the summing of the values of the extended spots where these spots overlap in the target image field.

Preferred embodiments of the holographic image projection system provide a multi-colour, more particularly a full colour display. Thus red, green and blue laser illumination of the SLM may be employed, time multiplexed to display three colour planes of the input image in turn. However, since the projection system operates by diffraction, the blue light diverges less than the red light and thus in preferred embodiments the target image also has three colour planes in which a different scaling is employed for each colour, to compensate for the differing sizes of the projected colour image planes. More particularly, since the red light diverges most, the target image field of the red colour plane is the smallest target image field of the three target image planes (since the target image has "anti-distortion" applied). In general the size of the target image field for a colour is inversely proportional to the wavelength of light used for that colour. In some preferred embodiments, however, rather than a simple scaling by wavelength being applied the distortion (more correctly anti-distortion) of each colour image plane may be mapped to a corresponding colour plane of the target image field using a calibration process which corrects for chromatic aberration within the projection system such as chromatic aberration within the projection optics, chromatic aberration caused by slight misalignment between rays for different colours within the optics, and the light.

Certain embodiments also provide a holographic image projection system processor configured to perform the above described image input, conversion to an anti-distorted target image, and generation of hologram data from the target image.

The holographic techniques employed in preferred embodiments of the projector facilitate miniaturisation of the projector. These techniques also facilitate handling of extreme distortion caused by projection onto a surface on which the projector is placed, this extreme distortion resulting from the geometry illustrated in later FIG. 1c in combination with the small size of the projector. Thus in some preferred embodiments the surface onto which the image is projected is no more than 1 m, 0.5 m, 0.3 m, 0.2 m, 0.15 m, or 0.1 m away from the output of the projection optics 102. Similarly in embodiments the distance from the output of the projection optics to the furthest edge of the displayed image (d2 in FIG. 1c later) is substantially greater than the distance from the output of the projection optics to the nearest edge of the displayed image (d1 in FIG. 1c), for example 50%, 100%, 150%, 200% or 250% greater. Depending upon the geometry the acute projection angle (angle Θ in FIG. 1c) may be less than 70°, 65°, 60°, 55°, 50°, or even 45°.

Thus in another aspect the invention provides a holographic image projection device having two configurations, a first configuration in which said device is able to project towards a vertical screen or surface and a second, table down projection configuration in which said device is configured to stand on a table surface and project downwards into said table surface, and wherein the device is further configured to apply distortion compensation to a holographically projected image when in said table down projection configuration, said distortion compensation compensating for distortion arising from projection of said image onto said table surface at an acute angle.

In some preferred embodiments the device incorporates a stand such as a bipod or tripod stand, and preferably also includes a sensor to automatically detect when the device is in its table-down projection configuration, automatically applying distortion compensation in response to such detection. However in some alternative arrangements rather than mechanically tilting the device, instead the projection optics may be adjusted to alter between forward and table-down projection, again preferably automatically sensing the configuration. In a simple configuration this could be achieved with a moveable or switchable mirror, but an alternative approach employs a wide angle or fisheye lens which when translated perpendicular to the output axis of the optics may be employed to move from forward projection to table-down projection at an acute angle.

Certain embodiments also provide a method of projecting an image onto a surface at an acute angle, the method comprising: inputting display image data defining an image for display; processing said display image data to generate target image data; defining a target image for projection, wherein said target image comprises a version of said image for display distorted to compensate for projection onto said surface at said acute angle; performing a holographic transform on said target image defined by said target image data to generate hologram data for a hologram of said target image; displaying said hologram data on a spatial light modulator illuminated by at least one laser; and projecting light from said at least one laser modulated by said hologram data displayed on said spatial light modulator onto said surface at said acute angle, to reproduce a substantially undistorted version of said image on said surface.

As previously described, a mapping between the input image and the anti-distorted target image may comprise either an analytical mapping, based on a mathematical function, or a numerical mapping, for example, derived from a calibration procedure or both. As previously mentioned in some preferred embodiment target image pixels are mapped to input image pixels to lookup target image pixel values. Preferably the target image is also corrected for area mapping distortion and, in a colour system, preferably the different colour planes are appropriately scaled so that they reproduced in the projection surface at substantially the same size.

Certain embodiments also provide processor control code to implement the above-described methods, in particular on a data carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Thus in a related aspect of the invention a carrier carrying processor control code to implement a method of projecting an image onto a surface at an acute angle, the method comprising: inputting display image data defining an image for display; processing said display image data to generate target image data defining a target image for projection, wherein said target image comprises a version of said image for display distorted to compensate for projection onto said surface at said acute angle; performing a holographic transform on said target image defined by said target image data to generate hologram data for a hologram of said target image; and outputting said hologram data for display of said hologram on a spatial light modulator (SLM) for reproducing said image for display on said surface.

Certain embodiments also provide a method of sharing an image between a group of people, the method comprising: providing a holographic image projection device having a table-down projection configuration in which said device is configured to stand on a table surface and project downwards onto said table surface; and projecting an image holographically onto said table surface to share said image.

In preferred embodiments of the above described projection systems, devices and methods preferably an (AD)OSPR-type procedure is employed to generate the hologram data. Thus in preferred embodiments a single displayed image or image frame is generated using a plurality of temporal holographic subframes displayed in rapid succession such that the corresponding images average in an observer's eye to give the impression of a single, noise-reduced displayed image.

BRIEF DESCRIPTION OF THE DRAWINGS

These and other aspects of the invention will now be further described, by way of example only, with reference to the accompanying figures in which:

FIGS. 1a to 1e show respectively, a side view and a view from above of a holographic table-down projector according to an embodiment of the invention, the projector in its table-down configuration, keystone distortion of a projected image, and a second embodiment of a holographic table-down projector having forward-projecting and table-down projecting configurations selected by moving an output lens;

DETAILED DESCRIPTION OF THE PREFERRED EMBODIMENTS

Figure 2:
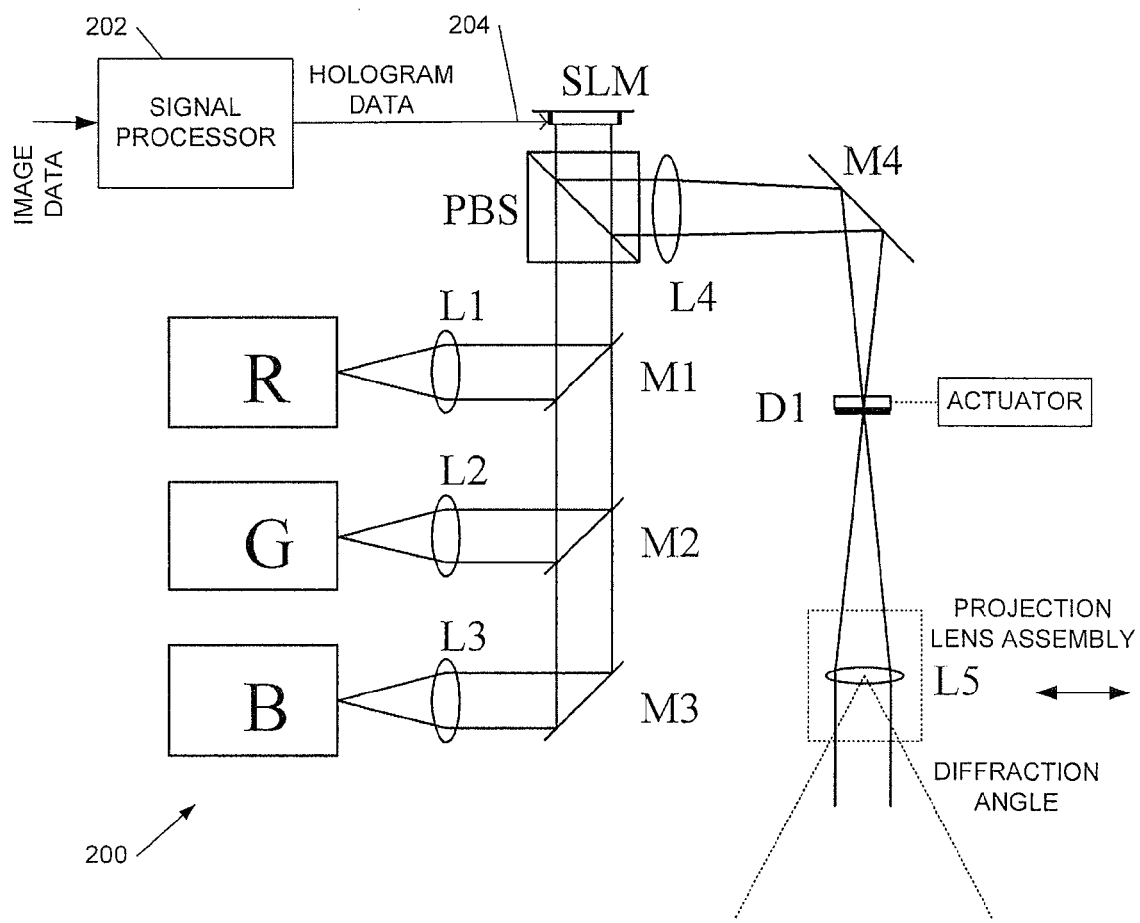
FIG. 2 shows an example optical configuration of a holographic image projector according to an embodiment of the invention.

Referring to FIG. 1a, this shows a side view of an embodiment of a holographic image projection device 100 having 2 configurations, the first configuration in which the device projects forwards, and a second configuration (shown in FIG. 1c) in which the device projects outwards and downwards onto a surface 106 such as a table-top. The device includes an output lens 102 and a foldable stand, for example a bipod stand 104 to support the device in its table-down configuration. In some preferred embodiments the foldable support 104 or some similar mechanism supports the device at a known angle to the surface 106 in its table-down configuration, which has the advantage that the degree of keystone distortion is also known and can therefore automatically be compensated for. Further, in embodiments because the table-down configuration is a pre-determined configuration a calibration procedure can be used to determine not only the general keystone distortion but also other aberrations which will typically be present albeit at a second order, so that compensation may also be made for these.

FIG. 1b shows the device 100 from above illustrating that, typically, the device may have a relatively wide lateral light output angle, in this example approximately 90°. The vertical light output angle is preferably smaller and in the illustrated example is around 45°. FIG. 1c shows the effect of tilting the arrangement of FIG. 1a downwards towards a surface such as a table-top-the keystone distortion of FIG. 1d results and as can be seen from distances d1 and d2 different regions of the projected image are at very different distances from the output lens (one distance may be 2 or 3 times the other). There will also be a difference in brightness between those regions of the displayed image close to the output lens and those further away.

In some preferred embodiments of the holographic projector 100 configuration of the device into the table-down projection mode is detected automatically, for example by detecting deployment of the stand or support 104, say by means of a microswitch or by using a tilt sensor to detect the tilting of the device into its table-down mode.

FIG. 1e shows an alternative embodiment of a holographic image projector 100' according to embodiment of the invention in which output optics 102' are configurable to select between a forward projection mode and a table-down projection mode. The latter may be selected, for example, by translating the output lens or optics 102' downwards, into an off-axis configuration to project the output image downwards. Again this translation may be detected automatically by a sensor; alternatively a control may be provided to control the optics to select either the forward projection or table-down mode.

Hologram Generation

Preferred embodiments of the invention use an OSPR-type hologram generation procedure, and we therefore describe examples of such procedures below. However embodiments of the invention are not restricted to such a hologram generation procedure and may be employed with other types of hologram generation procedure including, but not limited to: a Gerchberg-Saxton procedure (R. W. Gerchberg and W. O. Saxton, "A practical algorithm for the determination of phase from image and diffraction plane pictures" Optik 35, 237-246 (1972)) or a variant thereof, Direct Binary Search (M. A. Seldowitz, J. P. Allebach and D. W. Sweeney, "Synthesis of digital holograms by direct binary search" Appl. Opt. 26, 2788-2798 (1987)), simulated annealing (see, for example, M. P. Dames, R. J. Dowling, P. McKee, and D. Wood, "Efficient optical elements to generate intensity weighted spot arrays: design and fabrication," Appl. Opt. 30, 2685-2691 (1991)), or a POCS (Projection Onto Constrained Sets) procedure (see, for example, C.-H. Wu, C.-L. Chen, and M. A. Fiddy, "Iterative procedure for improved computer-generated-hologram reconstruction," Appl. Opt. 32, 5135-(1993)).

Optical System

FIG. 2 shows an example optical layout for a holographic image projection system 200 according to an embodiment of the invention. In the full colour holographic image projector of FIG. 2 there are red R, green G, and blue B lasers. The system also includes the following additional elements:

SLM is the hologram SLM (spatial light modulator).

L1, L2 and L3 are collimation lenses for the R, G and B lasers respectively (optional, depending upon the laser output).

M1, M2 and M3 are corresponding dichroic mirrors.

PBS (Polarising Beam Splitter) transmits the incident illumination to the SLM. Diffracted light produced by the SLM—naturally rotated (with a liquid crystal SLM) in polarisation by 90 degrees—is then reflected by the PBS towards L4.

Mirror M4 folds the optical path.

Lenses L4 and L5 form an output telescope (demagnifying optics), as with holographic projectors we have previously described. The output projection angle is proportional to the ratio of the focal length of L4 to that of L5. In embodiments L4 may be encoded into the hologram(s) on the SLM, for example using the techniques we have described in WO2007/110668, and/or output lens L5 may be replaced by a group of projection lenses. In embodiments L5 may comprise a wide-angle or fisheye lens, mounted for translation perpendicular to the output optical axis (left-right in FIG. 2), to enable configuration of the output optical system as an off-axis system for table-down projection.

D1 is a piezoelectrically-actuated diffuser located at intermediate image plane to reduce speckle, as we have described, for example in GB0800167.9. Moving the diffuser rapidly, preferably in two orthogonal directions to remove streaking, generates random phases on a length scale that is smaller and/or a time scale that is faster than the projected image pixel.

A system controller 202 performs signal processing in either dedicated hardware, or in software, or in a combination of the two, as described further below. Thus controller 202 inputs image data and provides hologram data 204 to the SLM.

In embodiments the SLM may be a liquid crystal device. Alternatively, other SLM technologies to effect phase modulation may be employed, such as a pixellated MEMS-based piston actuator device.

OSPR

Broadly speaking in our preferred method the SLM is modulated with holographic data approximating a hologram of the image to be displayed. However this holographic data is chosen in a special way, the displayed image being made up of a plurality of temporal sub-frames, each generated by modulating the SLM with a respective sub-frame hologram, each of which spatially overlaps in the replay field (in embodiments each has the spatial extent of the displayed image).

Each sub-frame when viewed individually would appear relatively noisy because noise is added, for example by phase quantisation by the holographic transform of the image data. However when viewed in rapid succession the replay field images average together in the eye of a viewer to give the impression of a low noise image. The noise in successive temporal subframes may either be pseudo-random (substantially independent) or the noise in a subframe may be dependent on the noise in one or more earlier subframes, with the aim of at least partially cancelling this out, or a combination may be employed. Such a system can provide a visually high quality display even though each sub-frame, were it to be viewed separately, would appear relatively noisy.

The procedure is a method of generating, for each still or video frame $I=I_{xy}$, sets of N binary-phase holograms $h^{(1)} \ldots h^{(N)}$. In embodiments such sets of holograms may form replay fields that exhibit mutually independent additive noise. An example is shown below:

1. Let $G_{xy}^{(n)} = I_{xy} \exp(j\phi_{xy}^{(n)})$ where $\phi_{xy}^{(n)}$ is uniformly distributed between 0 and $2\pi$ for $1 \leq n \leq N/2$ and $l \leq x, y \leq m$
2. Let $g_{uv}^{(n)} = F^{-1}[G_{xy}^{(n)}]$ where $F^{-1}$ represents the two-dimensional inverse Fourier transform operator, for $1 \leq n \leq N/2$
3. Let $m_{uv}^{(n)} = \Re\{g_{uv}^{(n)}\}$ for $1 \leq n \leq N/2$
4. Let $m_{uv}^{(n|N/2)} = \Im\{g_{uv}^{(n)}\}$ for $1 \leq n \leq N/2$ 5. Let $h_{uv}^{(n)} = \begin{cases} -1 & \text{if } m_{uv}^{(n)} < Q^{(n)} \\ 1 & \text{if } m_{uv}^{(n)} \geq Q^{(n)} \end{cases}$ where $Q^{(n)} = \text{median}(m_{uv}^{(n)})$ and $1 \leq n \leq N$ Step 1 forms N targets $G_{xy}^{(n)}$ equal to the amplitude of the supplied intensity target $I_{xy}$, but with independent identically-distributed (i.i.t.), uniformly-random phase. Step 2 computes the N corresponding full complex Fourier transform holograms $g_{uv}^{(n)}$. Steps 3 and 4 compute the real part and imaginary part of the holograms, respectively. Binarisation of each of the real and imaginary parts of the holograms is then performed in step 5: thresholding around the median of $m_{uv}^{(n)}$ ensures equal numbers of −1 and 1 points are present in the holograms, achieving DC balance (by definition) and also minimal reconstruction error. The median value of $m_{uv}^{(n)}$ may be assumed to be zero with minimal effect on perceived image quality.

Figure 3A:
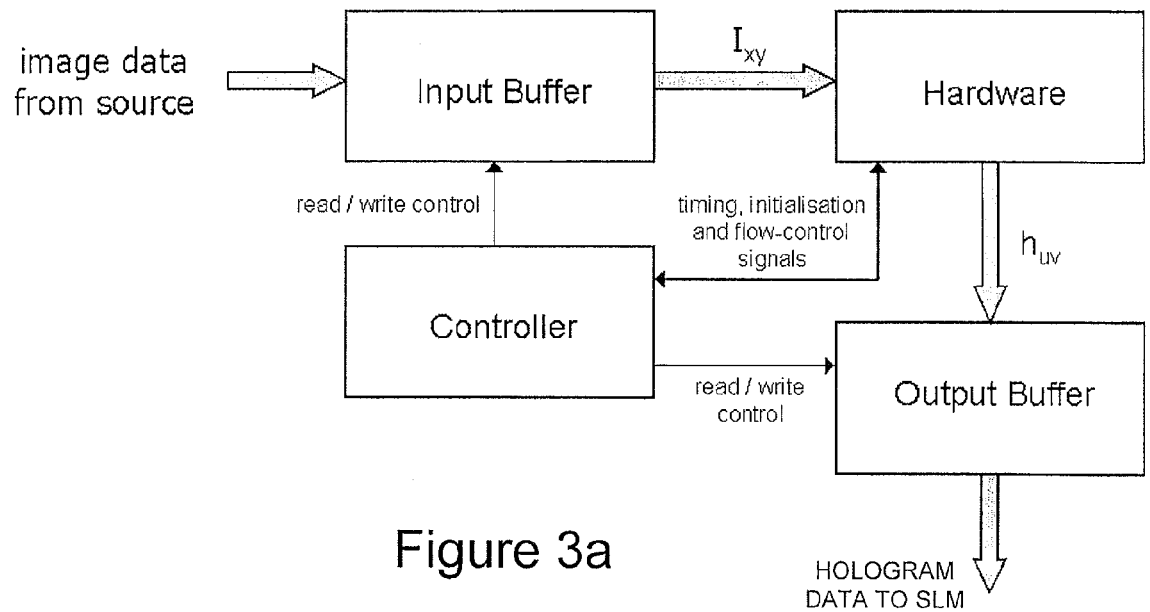
FIGS. 3a to 3d show, respectively, a block diagram of a hologram data calculation system, operations performed within the hardware block of the hologram data calculation system, energy spectra of a sample image before and after multiplication by a random phase matrix, and an example of a hologram data calculation system with parallel quantisers for the simultaneous generation of two sub-frames from real and imaginary components of complex holographic subframe data.

FIG. 3*a*, from our WO2006/134398, shows a block diagram of a hologram data calculation system configured to implement this procedure. The input to the system is preferably image data from a source such as a computer, although other sources are equally applicable. The input data is temporarily stored in one or more input buffer, with control signals for this process being supplied from one or more controller units within the system. The input (and output) buffers preferably comprise dual-port memory such that data may be written into the buffer and read out from the buffer simultaneously. The control signals comprise timing, initialisation and flow-control information and preferably ensure that one or more holographic sub-frames are produced and sent to the SLM per video frame period.

The output from the input comprises an image frame, labelled I, and this becomes the input to a hardware block (although in other embodiments some or all of the processing may be performed in software). The hardware block performs a series of operations on each of the aforementioned image frames, I, and for each one produces one or more holographic sub-frames, h, which are sent to one or more output buffer. The sub-frames are supplied from the output buffer to a display device, such as a SLM, optionally via a driver chip.

Figure 3B:
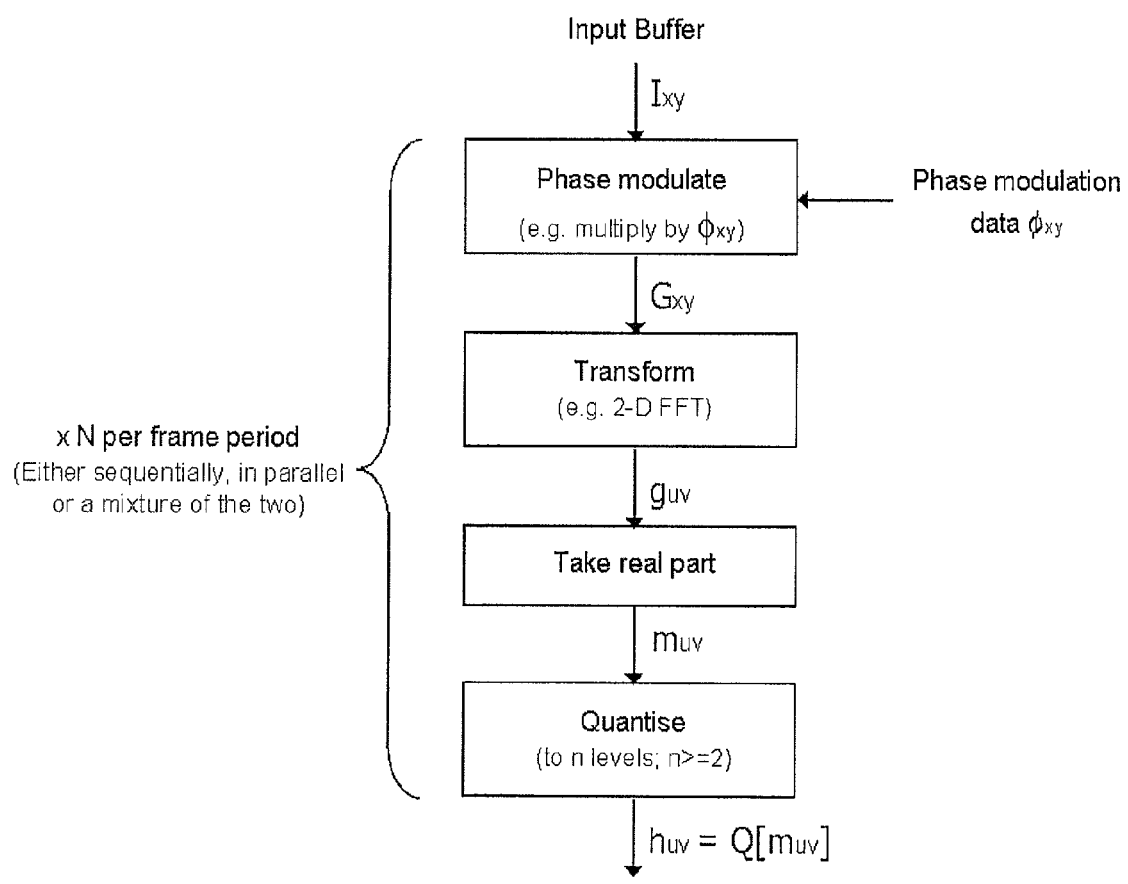

FIG. 3b shows details of the hardware block of FIG. 3a; this comprises a set of elements designed to generate one or more holographic sub-frames for each image frame that is supplied to the block. Preferably one image frame, $I_{xy}$, is supplied one or more times per video frame period as an input. Each image frame, $I_{xy}$, is then used to produce one or more holographic sub-frames by means of a set of operations comprising one or more of: a phase modulation stage, a space-frequency transformation stage and a quantisation stage. In embodiments, a set of N sub-frames, where N is greater than or equal to one, is generated per frame period by means of using either one sequential set of the aforementioned operations, or a several sets of such operations acting in parallel on different sub-frames, or a mixture of these two approaches.

Figure 3C:
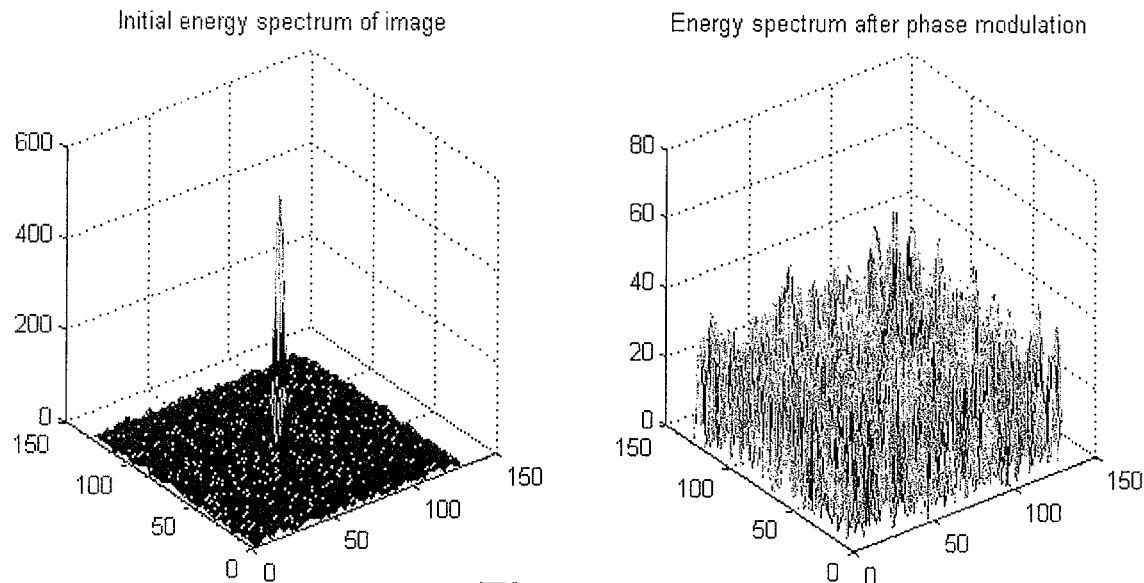

The purpose of the phase-modulation block is to redistribute the energy of the input frame in the spatial-frequency domain, such that improvements in final image quality are obtained after performing later operations. FIG. 3c shows an example of how the energy of a sample image is distributed before and after a phase-modulation stage in which a pseudo-random phase distribution is used. It can be seen that modulating an image by such a phase distribution has the effect of redistributing the energy more evenly throughout the spatial-frequency domain. The skilled person will appreciate that there are many ways in which pseudo-random binary-phase modulation data may be generated (for example, a shift register with feedback).

The quantisation block takes complex hologram data, which is produced as the output of the preceding space-frequency transform block, and maps it to a restricted set of values, which correspond to actual modulation levels that can be achieved on a target SLM (the different quantised phase retardation levels may need not have a regular distribution). The number of quantisation levels may be set at two, for example for an SLM producing phase retardations of 0 or π at each pixel.

Figure 3D:
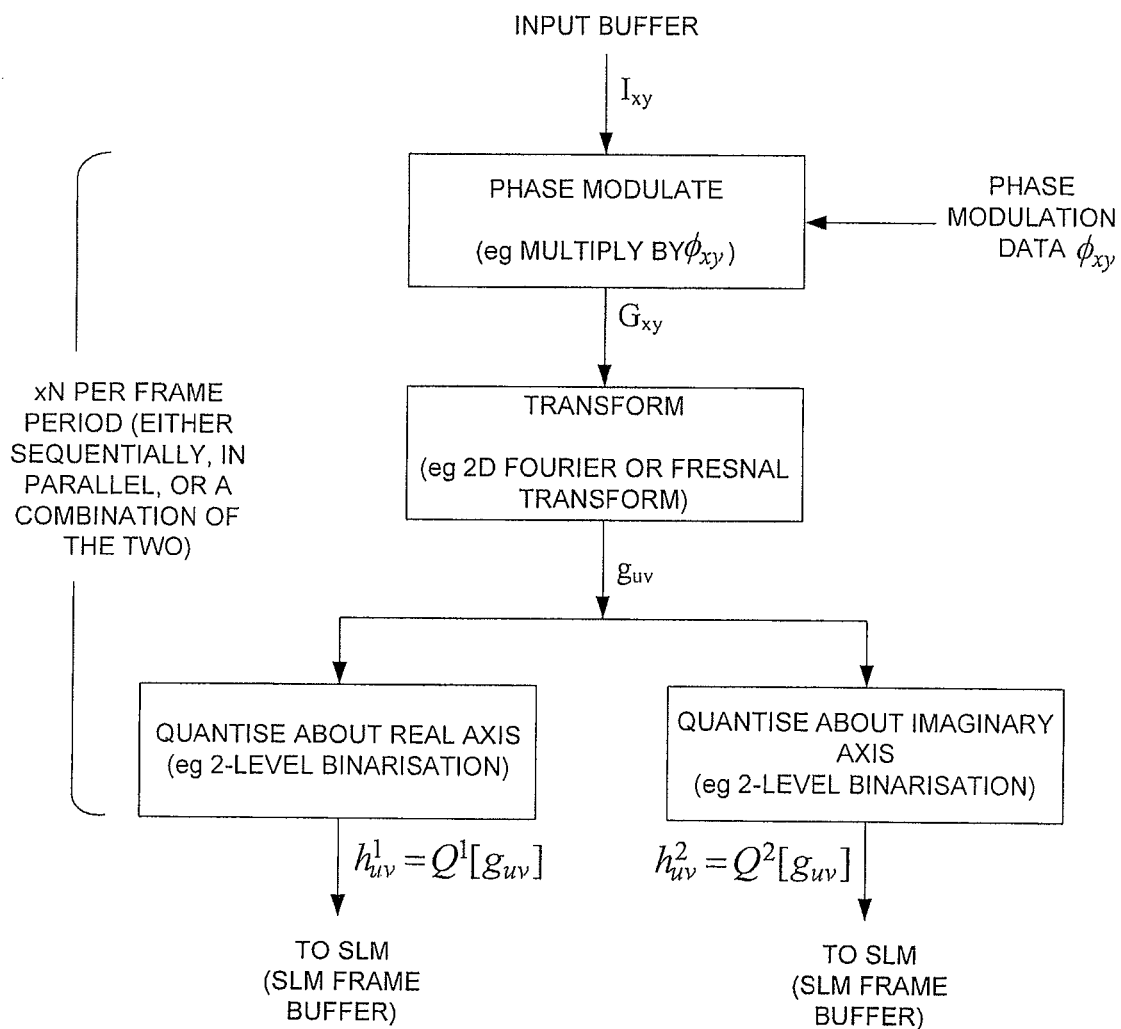

In embodiments the quantiser is configured to separately quantise real and imaginary components of the holographic sub-frame data to generate a pair of holographic sub-frames, each with two (or more) phase-retardation levels, for the output buffer. FIG. 3d shows an example of such a system. It can be shown that for discretely pixellated fields, the real and imaginary components of the complex holographic sub-frame data are uncorrelated, which is why it is valid to treat the real and imaginary components independently and produce two uncorrelated holographic sub-frames.

An example of a suitable binary phase SLM is the SXGA (1280×1024) reflective binary phase modulating ferroelectric liquid crystal SLM made by CRL Opto (Forth Dimension Displays Limited, of Scotland, UK). A ferroelectric liquid crystal SLM is advantageous because of its fast switching time. Binary phase devices are convenient but some preferred embodiments of the method use so-called multiphase spatial light modulators as distinct from binary phase spatial light modulators (that is SLMs which have more than two different selectable phase delay values for a pixel as opposed to binary devices in which a pixel has only one of two phase delay values). Multiphase SLMs (devices with three or more quantized phases) include continuous phase SLMs, although when driven by digital circuitry these devices are necessarily quantised to a number of discrete phase delay values. Binary quantization results in a conjugate image whereas the use of more than binary phase suppresses the conjugate image (see WO 2005/059660).

Adaptive OSPR

In the OSPR approach we have described above subframe holograms are generated independently and thus exhibit independent noise. In control terms, this is an open-loop system. However one might expect that better results could be obtained if, instead, the generation process for each subframe took into account the noise generated by the previous sub-frames in order to cancel it out, effectively "feeding back" the perceived image formed after, say, n OSPR frames to stage n+1 of the algorithm. In control terms, this is a closed-loop system.

One example of this approach comprises an adaptive OSPR algorithm which uses feedback as follows: each stage n of the algorithm calculates the noise resulting from the previously-generated holograms $H_1$ to $H_{n-1}$, and factors this noise into the generation of the hologram $H_n$ to cancel it out. As a result, it can be shown that noise variance falls as $1/N^2$. An example procedure takes as input a target image T, and a parameter N specifying the desired number of hologram sub-frames to produce, and outputs a set of N holograms $H_1$ to $H_N$, which, when displayed sequentially at an appropriate rate, form as a far-field image a visual representation of T which is perceived as high quality:

An optional pre-processing step performs gamma correction to match a CRT display by calculating $T(x, y)^{1.3}$. Then at each stage n (of N stages) an array F (zero at the procedure start) keeps track of a "running total" (desired image, plus noise) of the image energy formed by the previous holograms $H_1$ to $H_{n-1}$ so that the noise may be evaluated and taken into account in the subsequent stage: $F(x, y) := F(x, y) + |F[H_{n-1}(x, y)]|^2$. A random phase factor $\phi$ is added at each stage to each pixel of the target image, and the target image is adjusted to take the noise from the previous stages into account, calculating a scaling factor $\alpha$ to match the intensity of the noisy "running total" energy F with the target image energy $(T')^2$. The total noise energy from the previous n−1 stages is given by $\alpha F - (n-1)(T')^2$, according to the relation $$\alpha := \frac{\sum_{x,y} T'(x, y)^4}{\sum_{x,y} F(x, y) \cdot T'(x, y)^2}$$

and therefore the target energy at this stage is given by the difference between the desired target energy at this iteration and the previous noise present in order to cancel that noise out, i.e. $(T')^2 - [\alpha F - (n-1)(T')^2] = n(T')^2 + \alpha F$. This gives a target amplitude |T″| equal to the square root of this energy value, i.e.

$$T''(x, y) := \begin{cases} \sqrt{2T'(x,y)^2 - \alpha F} \cdot \exp\{j\phi(x, y)\} & \text{if } 2T'(x, y)^2 > \alpha F \\ 0 & \text{otherwise} \end{cases}$$

At each stage n, H represents an intermediate fully-complex hologram formed from the target T''' and is calculated using an inverse Fourier transform operation. It is quantized to binary phase to form the output hologram $H_n$, i.e.

$$H(x, y) := F^{-1}[T''(x, y)]$$

$$H_n(x, y) = \begin{cases} 1 & \text{if } \text{Re}[H(x, y)] > 0 \\ -1 & \text{otherwise} \end{cases}$$

Figure 4A:
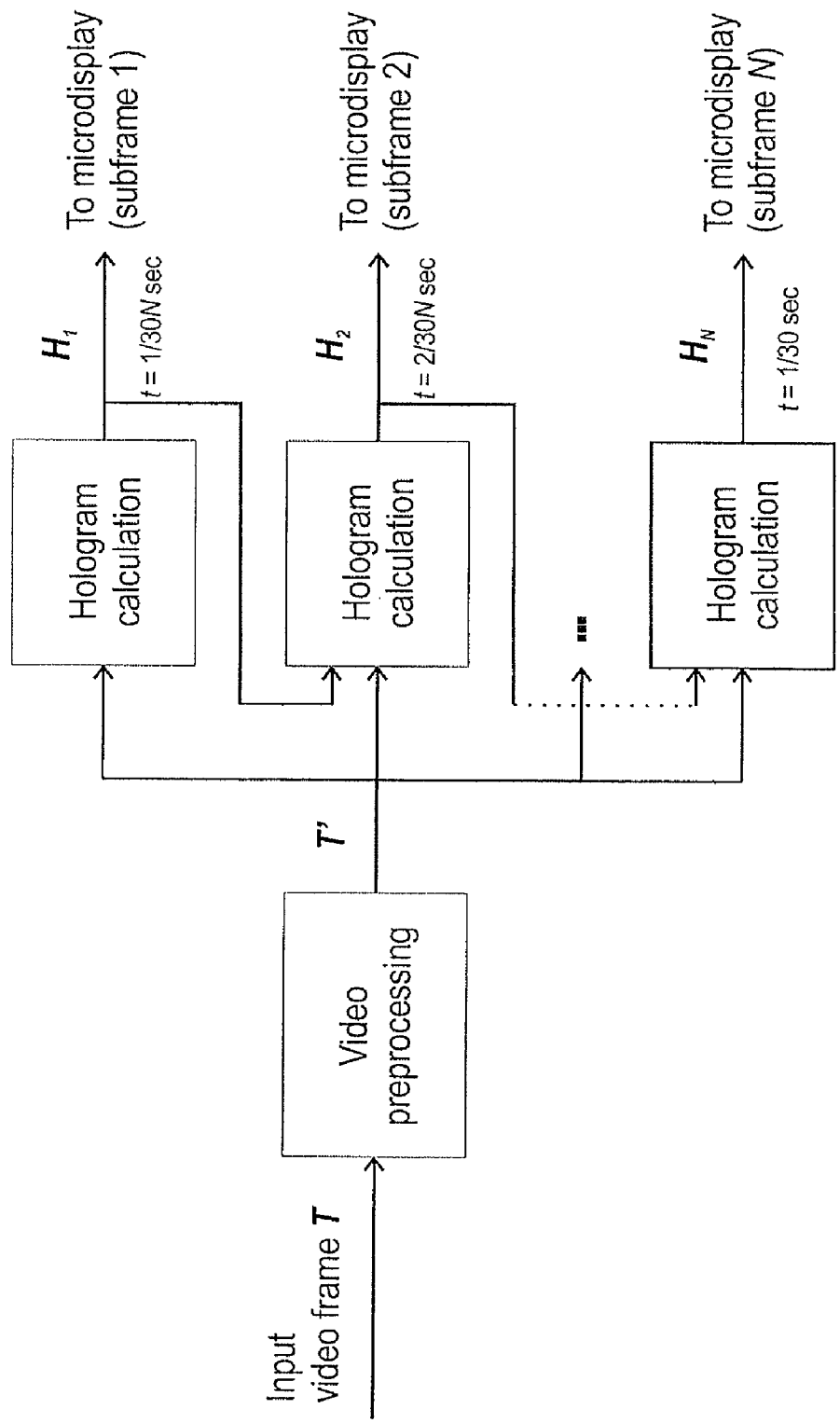
FIGS. 4a and 4b show, respectively, an outline block diagram of an adaptive OSPR-type system, and details of an example implementation of the system.
Figure 4B:
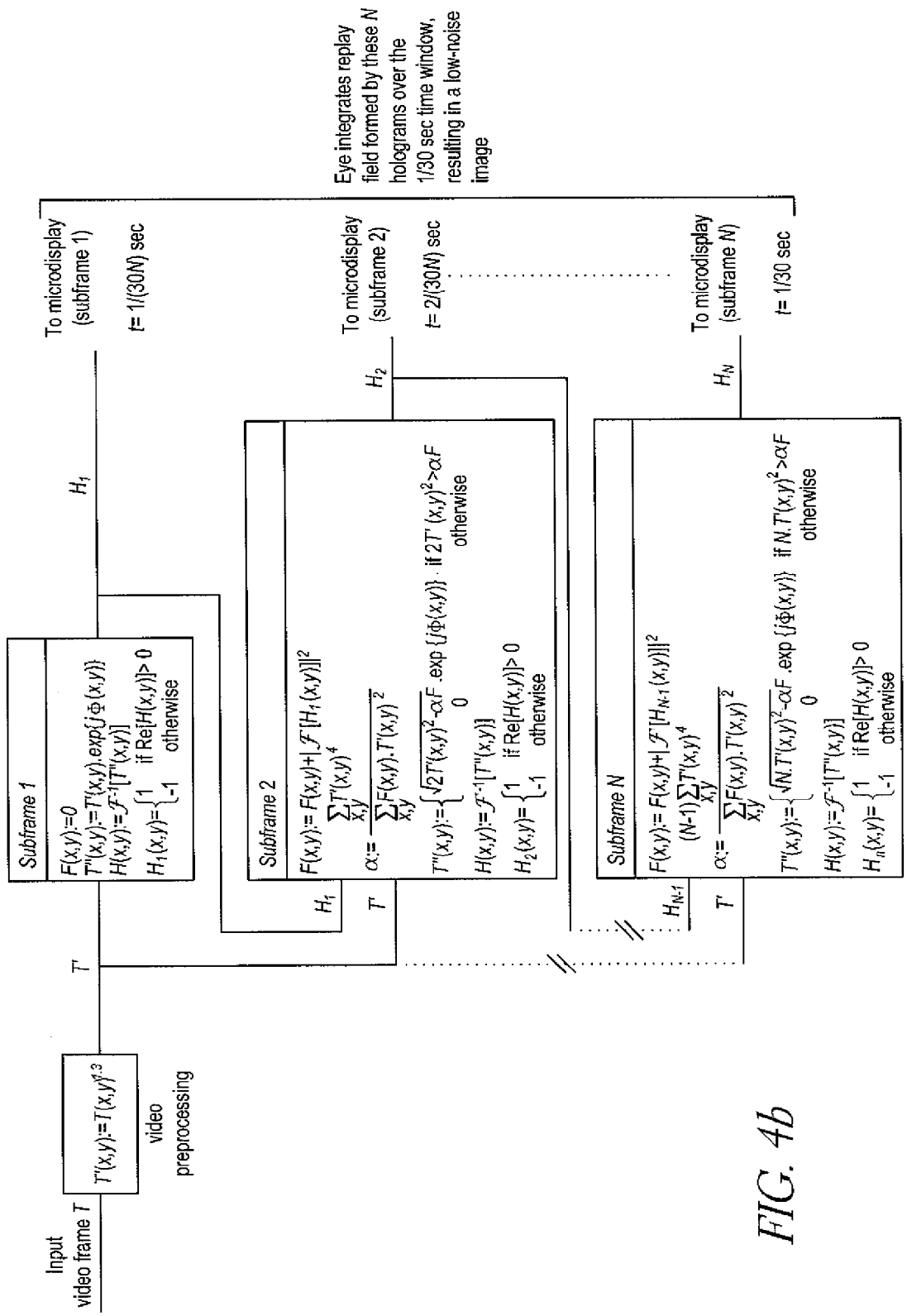

FIG. 4a outlines this method and FIG. 4b shows details of an example implementation, as described above.

Thus, broadly speaking, an ADOSPR-type method of generating data for displaying an image (defined by displayed image data, using a plurality of holographically generated temporal subframes displayed sequentially in time such that they are perceived as a single noise-reduced image), comprises generating from the displayed image data holographic data for each subframe such that replay of these gives the appearance of the image, and, when generating holographic data for a subframe, compensating for noise in the displayed image arising from one or more previous subframes of the sequence of holographically generated subframes. In embodiments the compensating comprises determining a noise compensation frame for a subframe; and determining an adjusted version of the displayed image data using the noise compensation frame, prior to generation of holographic data for a subframe. In embodiments the adjusting comprises transforming the previous subframe data from a frequency domain to a spatial domain, and subtracting the transformed data from data derived from the displayed image data.

More details, including a hardware implementation, can be found in WO2007/141567 hereby incorporated by reference.

Colour Holographic Image Projection

The total field size of an image scales with the wavelength of light employed to illuminate the SLM, red light being diffracted more by the pixels of the SLM than blue light and thus giving rise to a larger total field size. Naively a colour holographic projection system could be constructed by superimposed simply three optical channels, red, blue and green but this is difficult because the different colour images must be aligned. A better approach is to create a combined beam comprising red, green and blue light, as shown in FIG. 2 above, and to provide this to a common SLM, scaling the sizes of the images to match one another.

An example system comprises red, green, and blue collimated laser diode light sources, for example at wavelengths of 638 nm, 532 nm and 445 nm, driven in a time-multiplexed manner. Each light source comprises a laser diode and, if necessary, a collimating lens and/or beam expander. The total field size of the displayed image depends upon the pixel size of the SLM but not on the number of pixels in the hologram displayed on the SLM. A target image for display can be padded with zeros in order to generate three colour planes of different spatial extents for blue, green and red image planes. In the holograms for each colour plane the information in the hologram is distributed over the complete set of pixels.

Table-Down Holographic Image Projection

Figure 5A:
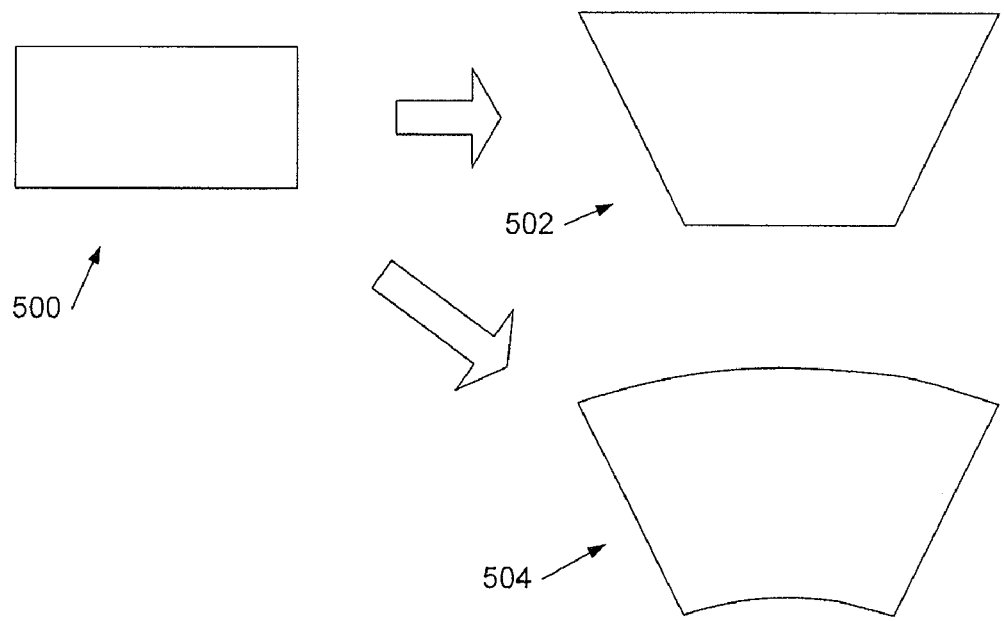
FIGS. 5a to 5c show, respectively, examples of different types of keystone distortion, an example calibration pattern for correction of keystone distortion, and an example target image field for processing by a hologram generation procedure for holographic image projection according to an embodiment of the invention.

Referring now to FIG. 5a this shows examples of two different types of keystone distortion of a rectangular input image 500, the trapezoidal pattern 502 resulting from the tilting shown in FIG. 1c, the arcuate trapezoidal pattern 504 resulting from translation of a fisheye output lens as shown in FIG. 1e. The degree of distortion depends upon the height of the output lens above the projection surface, and also on the angle of tilt.

The distortion patterns shown in FIG. 5a maybe described analytically, as is well known to those skilled in the art. For details reference may be made to, for example, Wikipedia®. Example equations describing the trapezoidal distortion of FIG. 5a are given in the prior art, for example in U.S. Pat. No. 6,367,933 (WO00/21282) at column 20 line 41 to column 21 line 6 and FIGS. 9A and 9B, to which reference may again be made for details. An alternative expression of the distortion, using warp polynomials, may be found in WO02/101443 at page 8 line 29 et seq., again to which reference may be made for details.

Figure 5B:
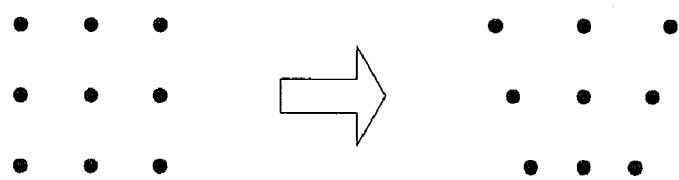

In an alternative approach a calibration pattern may be projected, as illustrated in FIG. 5b, which shows on the left hand side a grid of points and on the right hand side the projected, keystone-distorted image. A point in the distorted image may be associated with a point in the input image to define a mapping from one to the other. Such an approach is described in detail in the previously mentioned references. The distortion map may be defined for a single angle if, say, the angle at which the table-down projection is used is known or defined for example by the configuration of the projector; alternatively a range of distortion maps may be defined and stored for a range of different projection angles. The distortion map may be determined as a calibration for a single, reference device and then applied to other devices or alternatively the distortion may be mapped individually for a given holographic projector, for example during manufacture, and this map stored in non-volatile memory within the device. In either case the distortion map may take account of distortions other than keystone distortion, for example arising from the use of optical components with imperfections in the optical arrangement of FIG. 2. It will also be appreciated that separate distortion maps may be stored for red, green, and/or blue colour components of the projected image.

Figure 5C:
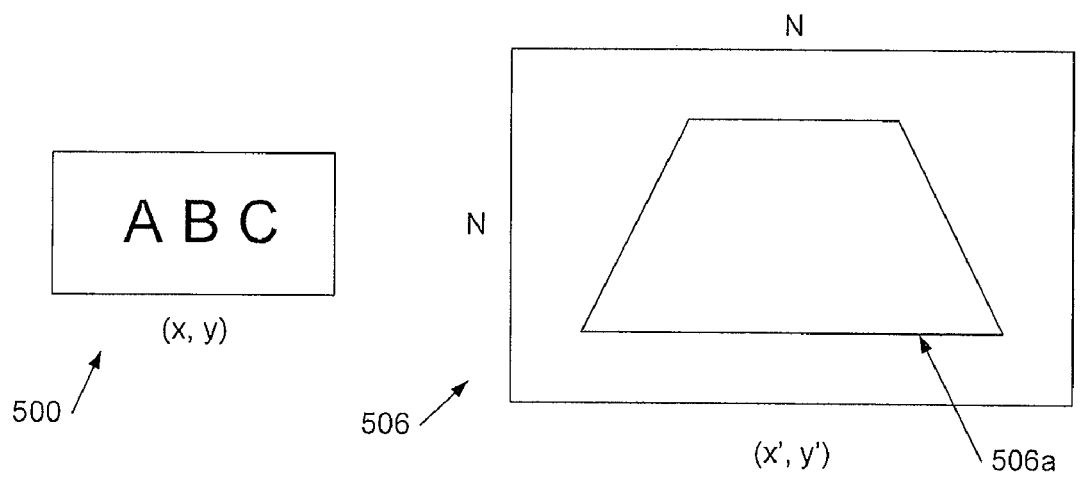

Referring now to FIG. 5c, this shows an input image 500 for display and a corresponding target image space 506 including a target image 506a for hologram generation, distorted so that when a hologram is generated from this the projected image compensates for the keystone distortion shown in FIG. 5a.

In embodiments the mapping between the target image 506a and the input image 500 is described by a pair of polynomial expansions and, more particularly by two sets of polynomial coefficients for these expansions. If we refer to the target image space using coordinates (x', y'), and the input image using coordinates (x, y) then we can define a location (x, y) in the input image space as a pair of functions f', g' of the coordinates in the (anti-distorted) target image space, as follows:

$$f'(x',y') \to x$$

$$g'(x',y') \to y$$

Likewise:

$$f(x,y) \to x'$$

$$g(x,y) \to y'$$

For reasons explained further below, it is preferable that the mapping from the target to the input image rather than vice-versa is employed.

An example pair of polynomial expansions is given below:

$$f'(x', y') = \sum_i \sum_j a_{ij} x^i y^j$$

$$g'(x', y') = \sum_i \sum_j b_{ij} x^i y^j$$

The first few terms of the polynomial expansion of f' are as follows:

$$f'(x',y') = a_{00} + a_{10}x + a_{01}y + a_{11}xy + a_{20}x^2 + \ldots$$

where broadly speaking coefficient $a_{00}$ defines position, $a_{10}$ and $a_{01}$ define scale, $a_{11}$ defines skew, and $a_{20}$ and so forth are higher order coefficients. The value of $a_{ij}$ is dependent on the angle of projection θ, on i and on j; the value of bij is similarly dependent on θ, i and j. It can be helpful to consider (x, y) space as being "camera"—that is defining what it is desired to project.

Figure 6A:
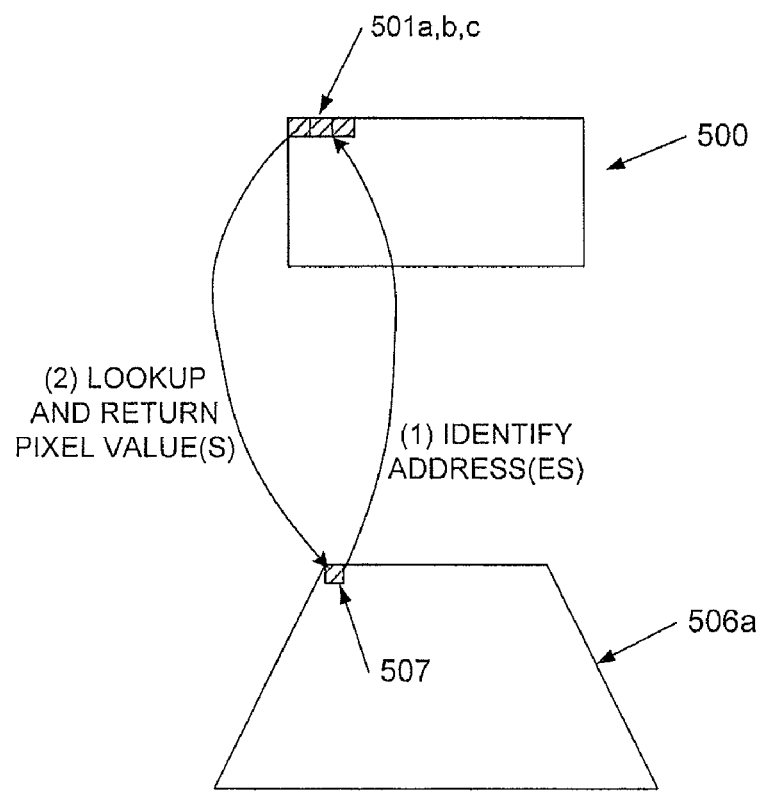
FIGS. 6a and 6b show, respectively, a pixel value lookup technique for use with embodiments of the invention, and an example of a multicolour target image field illustrating compensation for the different diffractive effects of different colours arising from holographic image projection according to an embodiment of the invention.

Referring now to FIG. 6a, this again shows the input image 500 and the target image 506a for hologram generation, the latter being "anti-distorted". More particularly FIG. 6a shows a single pixel 507 of target image 506a, illustrating how this pixel maps to a plurality of pixels 501a, b, c in the input image 500. This can be appreciated because the distortion effectively shortens the nearer edge of the input image as compared with the more distant edge from the output optics. Therefore in some preferred embodiments the target image is constructed by stepping through the (x', y') positions in the target image 506a and for each looking up the addresses of the corresponding pixels in the input image and using the values from these pixels, in the example pixels 501, a, b, c, to assign a value to the corresponding pixel 507 in the target image where, as in the example, multiple input image pixels correspond to a single target image pixel the values of the input image pixels may, for example, be summed or some other approach may be employed for example selecting a value such as a mean, medium or mode value. Thus preferred embodiments apply and inverse mapping, from the target to the input image space. By contrast mapping from the input image to the target image can leave holes in the target image, that is pixels with unpopulated values. In this case a single pixel of the input image may be mapped to a regular or irregular spot with an extended size (over multiple pixels) in the target image, optionally with a super imposed intensity distribution such as a gaussian distribution.

Once the target image T(x', y') has been created a hologram H(X, Y) of the target image is generated to approximate the following expression:

$$H(X, Y) = \sum_{i=0}^{N-1} \sum_{j=1}^{N-1} T(x', y') \exp\left(\frac{-2\pi j(ix + jy)}{N}\right)$$

where N represents the number of pixels in the hologram in the X and Y-directions (here for simplicity, the same number). Referring to the target image 506a shown in FIG. 5c, the region of the target image space 506 outside image 506a is filled with zeros and therefore in some preferred implementations the evaluation of H(X,Y) is performed over a window of target image space 506 defined by the target image 506a, for efficiency.

Figure 6B:
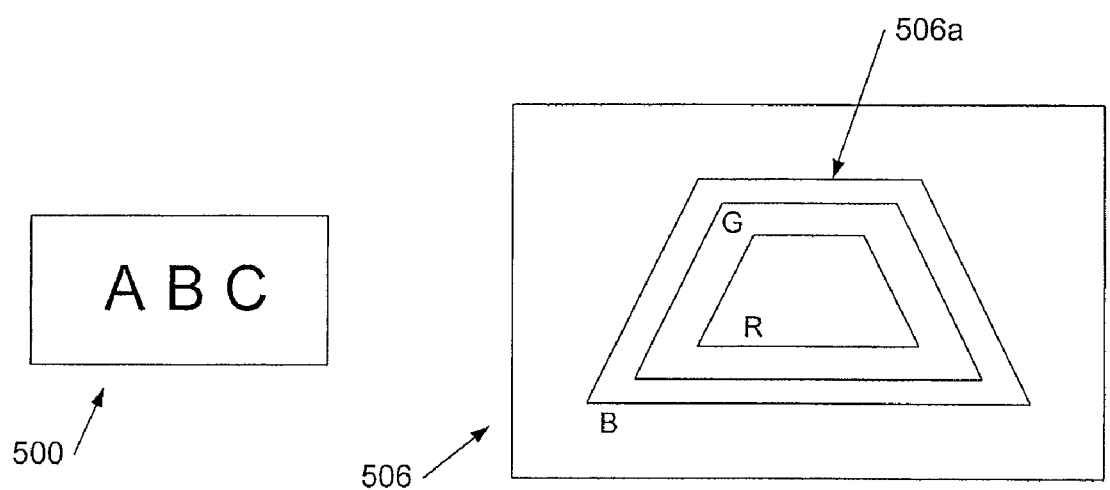

Referring now to FIG. 6b, we have described above an example of a colour holographic image projection system. In the context of table-down holographic image projection to provide a multicolour/full colour display preferred embodiments of the system employ three differently scaled and/or distorted target images 506a, as illustrated in FIG. 6b, one of each of the three laser colours red, green and blue-denoted R, G and B in the figure. Thus in embodiments separate functions f', g' are provided for each colour, although in other embodiments a single target image/distortion map is employed and scaled according to the wavelength of the laser light used for the respective colour plane, more particularly scaled by 1/λ. It will be understood that each pixel of a hologram calculated from the target image 506a contributes to substantially the whole displayed image, the displayed image is scaled in inverse proportion to wavelength—that is the blue image would be smaller because the blue light is diffracted less, and therefore the blue target image enlarged so that the projected images for the three colour planes substantially match inside.

Referring again to the polynomial expansions described above, for an inverse mapping, that is from target to input image space, where scaling is applied the (0,0) coefficients are not scaled, the (1,0) and (0,1) coefficients are scaled by reciprocal wavelength, and optionally the coefficients of higher power are scaled accordingly, for example the (1,1), (2,0), and (0,2) coefficients being scaled by $1/\lambda^2$ and so forth. Thus for example, for 440 nm blue light and 640 nm red light:

$$a_{10}^R = \frac{640}{440} a_{10}^B.$$

In other embodiments, however, a set of functions $f^R$, $g^R$, $f^G$, $g^G$, $f^B$, $g^{B_1}$ is employed to correct for chromatic aberration, positioning of the different coloured lasers and the light. When mapping using a forward function from the input image to the target image space the scaling applied is to multiply rather than divide by wavelength and the above approaches are adapted mutatis mutandis.

It is further desirable to correct for changes in brightness per unit area which result from the distortion of the type shown in FIG. 5a. One approach would be to calibrate for this change and provide an anti-distortion calibration map to apply similarly to that for spatial distortion. Another approach, however, is to determine an intensity scale factor as a function of position, for example by determining what change of area in the original, input image results from a change of corresponding area in the anti-distorted space of target image 506a by the same amount. This can be determined by determining the derivative of the target image 506a with respect to the input image 500 in each of two orthogonal directions in the image plane, more particularly by calculating an intensity scale factor A(x', y') according to the following equation:

$$A(x', y') = \frac{\partial f'(x', y')}{\partial x} \Box \frac{\partial g'(x', y')}{\partial y}$$

The skilled person will appreciate that in going from an input image pixel value to a target image pixel value, if the pixel value defines an intensity then this should be multiplied by (1/A) whereas if the pixel value defines amplitude then in going from the input image to the target image 506a the amplitude is multiplied by $(1/\sqrt{A})$.

A different approach may, however, be employed when forward mapping from the input image to the target image space. In this case where an input image pixel is mapped to an extended area or spot in the target image space area correction may be performed automatically by adding the contributions from overlapping spots in the target image space—that is a target image pixel value maybe determined by adding pixel values from input image pixels whose extended spots overlap that target image pixel.

In preferred embodiments of the technique an OSPR-type or ADOSPR approach is employed to calculate the holograms for display on the spatial light modulator, as this provides substantial efficiency advantages.

Figure 7:
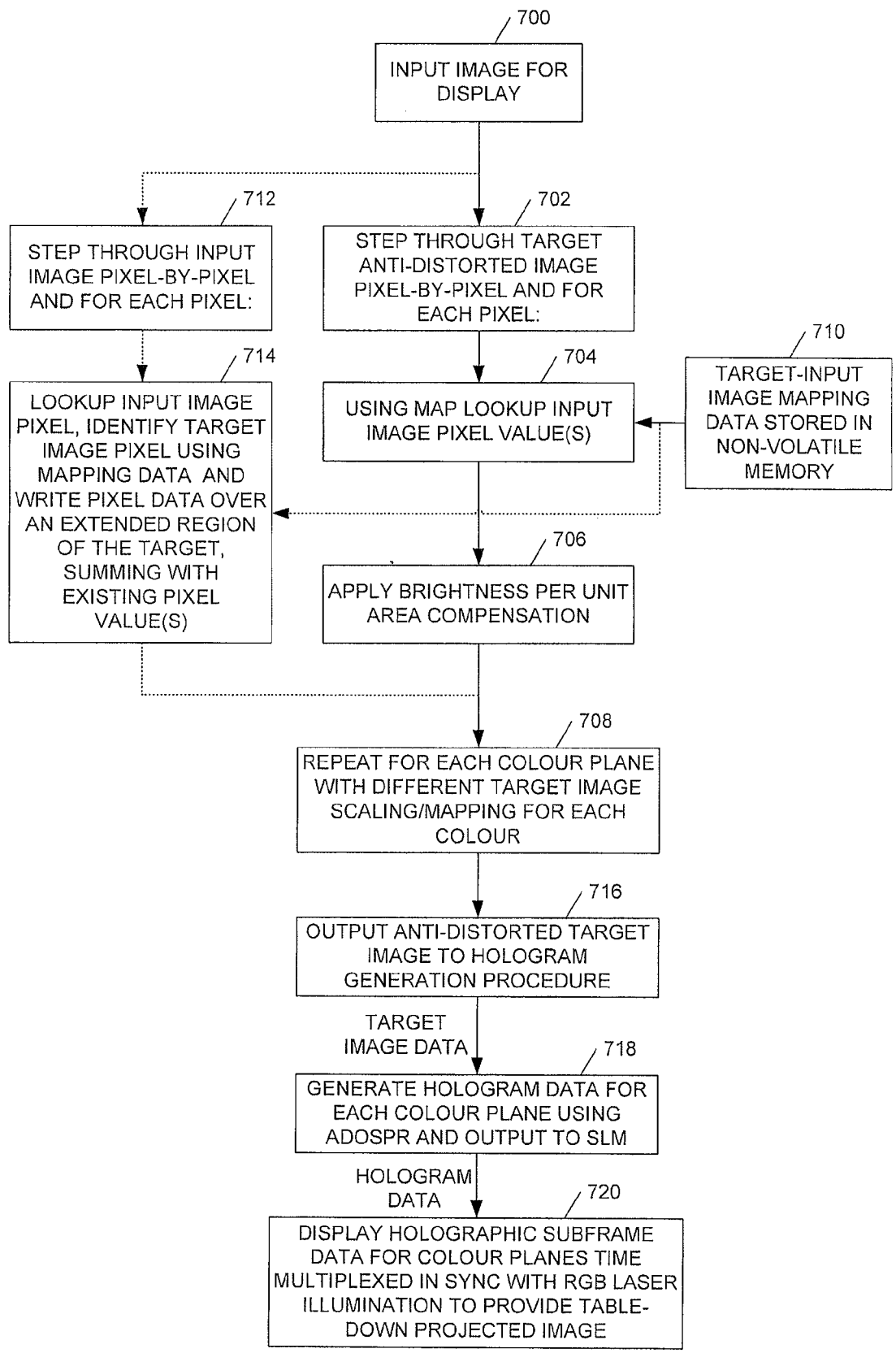
FIG. 7 shows procedures for generating target holographic projection images for a table-down holographic image projector according to an embodiment of the invention.

Referring now FIG. 7 this shows a flow diagram of an embodiment of a procedure to implement table-down holographic image projection according to embodiments of the invention (the procedure covers the inverse mapping and forward mapping alternatives described above).

Data for an input image for display is received at step 700. Then in an inverse mapping procedure, the procedure steps through the target "anti-distorted" image pixel by pixel (702) and for each target image pixel uses the inverse map to lookup one or more corresponding input image pixel values (704), where the inverse map is to multiple input image pixels averaging (or otherwise combining) these. The procedure then applies brightness per unit area compensation (706) as described above and is repeated for each colour plane (708). In preferred embodiments the procedure the inverse map is stored in the form of polynomial coefficients as described above, in non-volatile memory (710). Alternatively some other numeric representation of a map may be employed, or an analytical formula may be used.

In an alternative approach the procedure steps through the input image pixel by pixel (712) and for each input image pixel maps this to an extended region of the target image using the mapping store in non volatile memory, summing with existing pixel values (714), and again performing this procedure for each colour plan (708).

The "anti-distorted" target image data is then provided to a hologram generation procedure (716), in preferred embodiments and ADOSPR-type procedure as described above. This generates holographic data comprising multiple temporal holographic subframes for each colour plane of the target image and outputs this for display on the SLM (718). The SLM displays the multiple holographic subframes for each colour frame, time multiplexed in synchrony with the red, green and blue laser illumination, to provide the table-down holographically projected image (720).

Figure 8A:
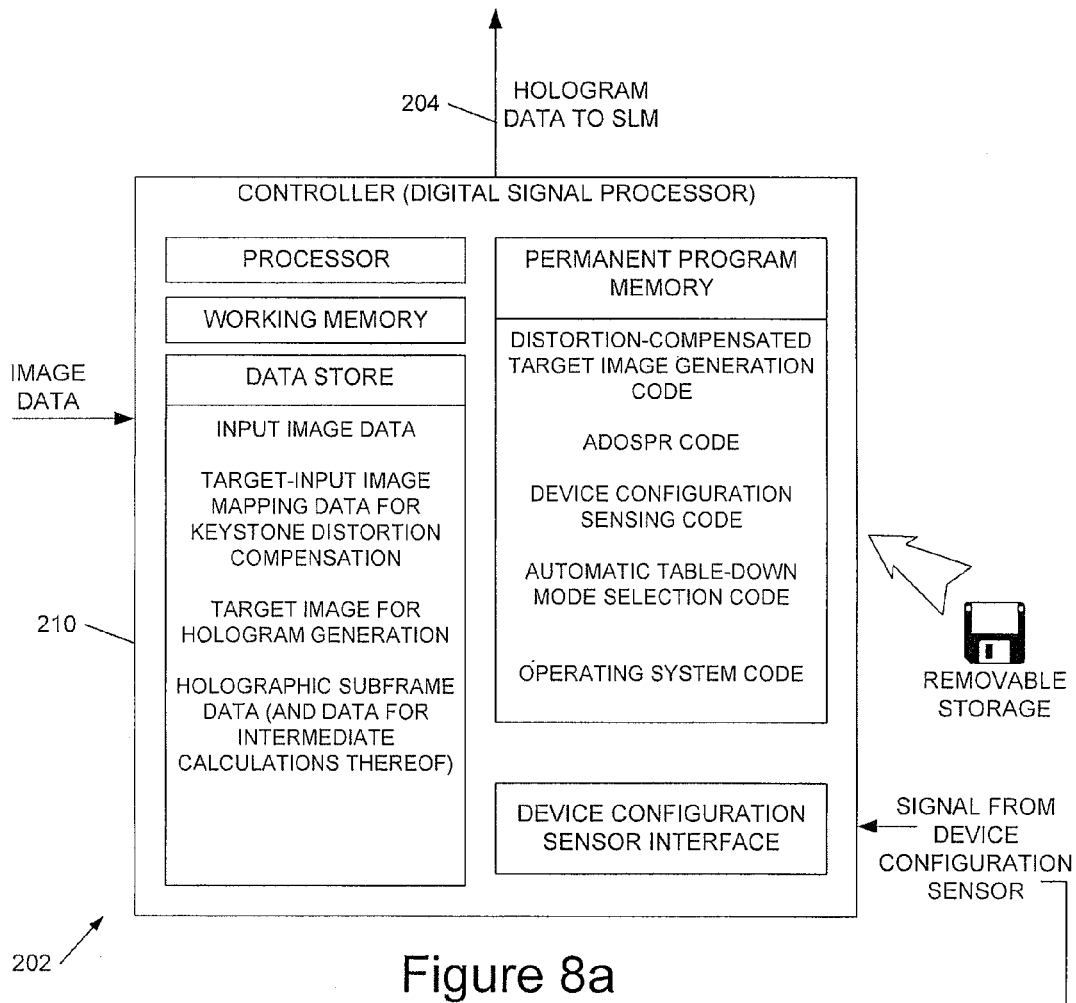
FIGS. 8a and 8b show, respectively a software implementation of an embodiment of a table-down holographic projection system controller according to an embodiment of the invention, and a hardware implementation of an embodiment of table-down holographic projection system controller according to an embodiment of the invention.

FIG. 8*a* shows a first example implementation of a holographic table-down image projection system controller 202 (as shown in FIG. 2), including a digital signal processor 210 operating under control of processor control code (which may be provided on a storage medium such as Flash memory) to implement a procedure as described above.

Figure 8B:
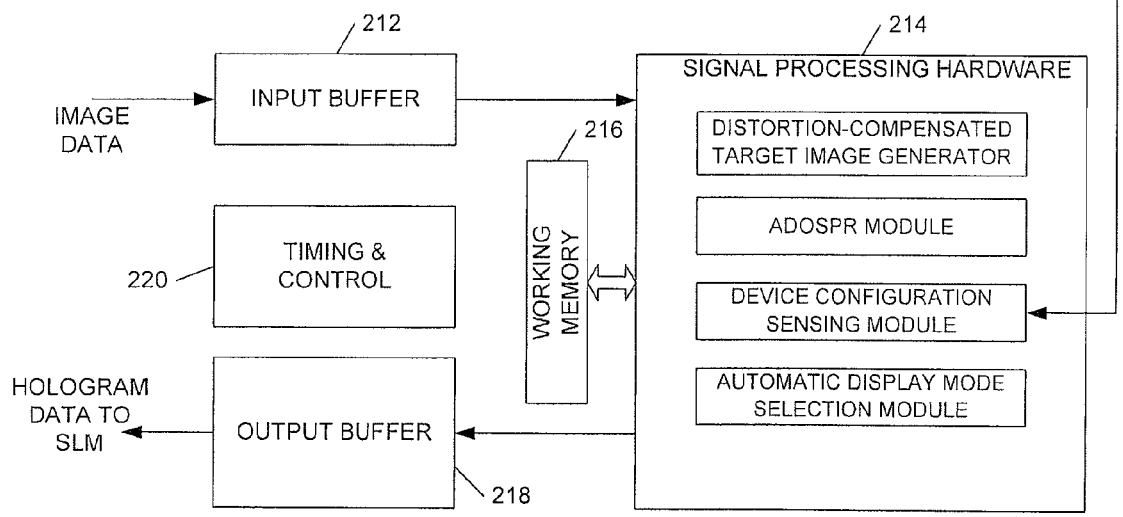

FIG. 8*b* shows an alternative implementation of a holographic table-down projection system controller 202 employing dedicated signal processing hardware 214 such as an FPGA (field programmable gate array) or ASIC (application specific integrated circuit). In FIG. 8*b* signal processing hardware 214 is coupled to working memory 216 and operates under control of a timing and control section 220 to receive input image data via an input buffer 212 and to provide hologram data to the SLM via an output buffer 218. The signal processing hardware includes a distortion-compensated target image generator, an ADOSPR module and in the illustrated example, a device configuration sensing module receiving a signal from a device configuration sensor, and an automatic display mode selection module to, in effect, switch in or out the distortion compensated target image generator responsive to whether a table-down or forward projecting device configuration is sensed. The digital signal processor of FIG. 8*a* includes corresponding processor control code and an interface to receive the device configuration. As previously described depending upon the implementation a range of different sensing devices including, but not limited to, an electrical sensor such a microswitch, a magnetic sensor, such a Hall effect device, a tilt sensor or other orientation sensor, an accelerometer for example of the MEMS type, or an optical sensor for example incorporated into or alongside the projection optics.

We have described table-down holographic image projection systems which project an image forward and down as shown, for example, in FIG. 1*c*. However the skilled person that corresponding techniques may also be employed to project an image sideways and down, in addition to or instead of forwards and down. This may be achieved by compensating for horizontal keystone distortion additionally or alternatively to the above described compensation, using a corresponding approach. The skilled person will also appreciate that whilst techniques such as those described above are particularly useful for table-down projection they may also be advantageously employed when projecting at an acute angle onto any nearby surface where extreme distortion, depth of field problems and the like would make other techniques impractical. It will also be appreciated that although, in general, the surface projected onto will be substantially planar the distortion compensation techniques we describe are not limited to projection onto planar surfaces and may also be employed, for example, to project onto a curved surface without substantial distortion. In generally the techniques facilitate projection onto a surface at very short range and at an acute angle—which facilitates applications in a wide range of applications where such projection has hitherto been very difficult or impractical.

Applications for the above described systems include, but are not limited to, the following: add-on data projection devices, for example for computers especially portable/laptop computers; mobile phones; PDAs; laptops; digital cameras; digital video cameras; games consoles; in-car displays including (but not limited to) in-car cinema; navigation systems; personal media players (for example an MP3 player or personal video player); laser light show boxes; personal video projectors (a "video iPod®" concept); advertising and signage systems; computers (including desktops); remote control units; architectural fixtures incorporating a holographic image display system; and, more generally, any device where it is desirable to share pictures and/or for more than one person at once to view an image.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A holographic image projector comprising a holographic image projection system for projecting an image at an acute angle onto a surface, the system comprising:
   a spatial light modulator (SLM) to display a hologram;
   an illumination system to illuminate said displayed hologram;
   projection optics to project light from said illuminated displayed hologram onto said surface at an acute angle to form said image; and a processor having an input to receive input image data for display and an output to provide hologram data for said spatial light modulator, and wherein said processor is configured to:
  input image data;
  convert said input image data to target image data;
  generate from said target image data hologram data for display as a hologram on said spatial light modulator to reproduce a target image corresponding to said target image data; and
  output said hologram data for said spatial light modulator;
  wherein said target image is distorted to compensate for said projection of said hologram at said acute angle to form said image;
wherein said holographic image projector is configured to stand on said surface and project downwards onto said surface, away from said projector, at said acute angle; and
wherein diffracted light from a single pixel of said hologram displayed in said SLM contributes to a substantial entirety of said projected image, wherein said diffracted light is distorted, and wherein said conversion of said input image data to said target image data further comprises compensating for variations in per unit area brightness of said projected image due to said acute angle projection by applying a scale factor to a value of a pixel in said target image data, wherein said scale factor is dependent on a location in two dimensions of said pixel in a distorted target image space represented by said target image data.

2. A holographic image projector as claimed in claim 1 wherein said conversion of said input image data to said target image data comprises mapping pixels of said target image data to pixels of said input image data and looking up values for said pixels of said target image data in said input image data.

3. A holographic image projector as claimed in claim 1 wherein said conversion of said input image data to said target image data comprises mapping pixels of said input image data to pixels of said target image data such that a plurality of pixels of said target image data have values dependent on a single pixel of said input image data and additionally or alternatively such that a single pixel of said target image data has a value dependent on values of a plurality of pixels of said input image data.

4. A holographic image projector as claimed in claim 1 wherein said projected image comprises a multicolour image, wherein said illumination system comprises a multicolour illumination system and, wherein said conversion of said input image data to said target image data comprises compensating for different scaling of different colour components of said multicolour projected image due to said holographic projection.

5. A holographic image projector as claimed in claim 4 wherein said compensating further comprises compensating for different aberrations of said different colour components by spatial mapping of said aberrations for a said colour component.

6. A holographic image projector as claimed in claim 1 wherein said processor is configured to generate from said target image data hologram data for display by omitting to process portions of target image space in which said target image data is located from which data for said image is absent.

7. A holographic image projector as claimed in claim 1 wherein said surface is no more than 1 m away from an output of said projection optics.

8. A holographic image projector as claimed in claim 1 having two configurations, a first configuration in which said device is able to project towards a vertical screen or surface and a second, table down projection configuration in which said device is configured to stand on a table surface and project downwards into said table surface, and wherein the device is further configured to apply distortion compensation to a holographically projected image when in said table down projection configuration, said distortion compensation compensating for distortion arising from projection of said image onto said table surface at an acute angle.

9. A holographic image projector as claimed in claim 8 further comprising a sensor to automatically detect when said device is in said second configuration and to apply said distortion compensation in response to said automatic detection.

10. A holographic image projector as claimed in claim 9 wherein said surface is no more than 1 m away from an output of the projection optics.

11. A holographic image projector as claimed in claim 9 wherein said surface is no more than 0.5 m away from an output of the projection optics.

12. A holographic image projector as claimed in claim 9 wherein said surface is no more than 0.3 m away from an output of the projection optics.

13. A holographic image projector as claimed in claim 12 wherein said surface is no more than 0.2 m away from an output of the projection optics.

14. A holographic image projector as claimed in claim 8 wherein said device includes a stand to support said device at a said acute angle to said table surface in said second, table down projection configuration.

15. A holographic image projector as claimed in claim 1 wherein said acute angle is less than 65°.

16. A holographic image projector as claimed in claim 1 wherein said projection optics are configured to project light over a first distance to a nearest edge of said image from the projection optics and to project light over a second distance to a farthest edge of said image from the projection optics, and wherein said second distance is at least 50% greater than said first distance.

17. A holographic image projector as claimed in claim 1 wherein said surface is no more than 0.5 m away from an output of said projection optics.

18. A holographic image projector as claimed in claim 1 wherein said surface is no more than 0.3 m away from an output of said projection optics.

19. A holographic image projector as claimed in claim 1 wherein said surface is no more than 0.2 m away from an output of said projection optics.

20. A holographic image projector as claimed in claim 1 wherein said acute angle is less than 60°.

21. A holographic image projector as claimed in claim 1 wherein said acute angle is less than 55°.

22. A holographic image projector as claimed in claim 1 wherein said acute angle is less than 50°.

23. A holographic image projector as claimed in claim 1 wherein said acute angle is less than 45°.

24. A holographic image projector as claimed in claim 1 wherein said projection optics are configured to project light over a first distance to a nearest edge of said image from the projection optics and to project light over a second distance to a farthest edge of said image from the projection optics, and wherein said second distance is at least 100% greater than said first distance.

25. A holographic image projector as claimed in claim 1 wherein said projection optics are configured to project light over a first distance to a nearest edge of said image from the projection optics and to project light over a second distance to a farthest edge of said image from the projection optics, and wherein said second distance is at least 150% greater than said first distance.

26. A holographic image projector as claimed in claim 1 wherein said projection optics are configured to project light over a first distance to a nearest edge of said image from the projection optics and to project light over a second distance to a farthest edge of said image from the projection optics, and wherein said second distance is at least 200% greater than said first distance.

27. A holographic image projector as claimed in claim 1 wherein said projection optics are configured to project light over a first distance to a nearest edge of said image from the projection optics and to project light over a second distance to a farthest edge of said image from the projection optics, and wherein said second distance is at least 250% greater than said first distance.

28. A holographic image projector as claimed in claim 1 further comprising non-volatile memory storing data defining a distortion map of a defined degree of distortion of said target image.

29. A holographic image projector as claimed in claim 28 wherein said distortion map compensates for distortion other than keystone distortion.

30. A holographic image projector as claimed in claim 29 wherein said non-volatile memory stores data defining a plurality of said distortion maps for a plurality of colour components of said projected image.

31. A holographic image projector as claimed in claim 1 wherein said acute angle is a predetermined angle defined by a predetermined configuration of said holographic image projector, wherein said predetermined angle defines a degree of said distortion of said target image such that when said holographic image projector is in said predetermined configuration said distortion of said target image automatically compensates for projection at said predetermined angle.

32. A holographic image projector as claimed in claim 1 wherein said scale factor indicates what change of area in a space represented by said input image data results from a change of area in said distorted target image space by a same amount and at a corresponding position.

33. A holographic image projector as claimed in claim 32 wherein said scale factor is applied by summing contribution from pixels of said input image data in said distorted target image space.

34. A holographic image projection system processor comprising:
an input configured to receive input image data for display;
an output configured to provide hologram data for a spatial light modulator (SLM) for displaying a hologram illuminated by an illumination system such that light from the illuminated displayed hologram is projected onto a surface at an acute angle to form an image;
wherein the processor is configured to:
input image data;
convert said input image data to target image data;
generate from said target image data hologram data for display as a hologram on the spatial light modulator to reproduce a target image corresponding to said target image data; and
output said hologram data for said spatial light modulator;
wherein said target image is distorted to compensate for said projection of said hologram at said acute angle to form said image; and
wherein diffracted light from a single pixel of said hologram displayed in said SLM contributes to substantially an entirety of said projected image, wherein said diffracted light is distorted, and wherein said conversion of said input image data to said target image data further comprises compensating for variations in per unit area brightness of said projected image due to said acute angle projection by applying a scale factor to a value of a pixel in said target image data, wherein said scale factor is dependent on a location in two dimensions of said pixel in a distorted target image space represented by said target image data.

35. A holographic mage projection system processor as claimed in claim 34 wherein said scale factor indicates what change of area in a space represented by said input image data results from a change of area in said distorted target image space by a same amount and at a corresponding position.

36. A holographic image projection system processor as claimed in claim 35 wherein said scale factor is applied by summing contribution from pixels of said input image data in said distorted target image space.

* * * * *

UNITED STATES PATENT AND TRADEMARK OFFICE
CERTIFICATE OF CORRECTION

PATENT NO. : 8,154,780 B2  Page 1 of 1
APPLICATION NO. : 12/335423
DATED : April 10, 2012
INVENTOR(S) : Cable et al.

It is certified that error appears in the above-identified patent and that said Letters Patent is hereby corrected as shown below:

Column 8, Line 38, "and $I \leqq x$," should be changed to --and $1 \leqq x$,--

Column 14, Lines 32-33, "$f^R, g^R, f^G, g^G, f^B, g^B$" should be changed to -- $f^{R_1}, g^{R_1}, f^{G_1}, g^{G_1}, f^{B_1}, g^{B_1}$ --

Column 18, Line 28, "as claimed in claim 12" should be changed to --as claimed in claim 9--

Column 20, Line 37, "A holographic mage" should be changed to --A holographic image--

Signed and Sealed this
Fourth Day of September, 2012

David J. Kappos
*Director of the United States Patent and Trademark Office*